United States Patent [19]

Lee

[11] E Patent Number: Re. 33,750

[45] Reissued Date of Patent: Nov. 26, 1991

[54] SIGNAL CABLE ASSEMBLY

[76] Inventor: Noel Lee, 47 W. Park Dr., Daly City, Calif. 94015

[21] Appl. No.: 253,227

[22] Filed: Oct. 4, 1988

Related U.S. Patent Documents

Reissue of:

[64] Patent No.: 4,731,506
Issued: Mar. 15, 1988
Appl. No.: 925,831
Filed: Oct. 29, 1986

[51] Int. Cl.[5] ..... H01B 11/02

[52] U.S. Cl. ..... 174/115; 174/34; 174/113 R; 174/114 R; 174/117 F

[58] Field of Search ..... 174/115, 113 R, 114 R, 174/117 R, 117 F, 34

[56] References Cited

U.S. PATENT DOCUMENTS

| | | | |
|---|---|---|---|
| 1,211,153 | 1/1917 | Hochstadter | 174/115 |
| 1,727,971 | 9/1929 | Ford | 174/112 |
| 2,455,773 | 12/1948 | Johnson | 174/117 R |
| 2,978,530 | 4/1961 | Braeckman | 174/34 |
| 3,102,160 | 8/1963 | Cook et al. | 174/105 R |
| 3,261,907 | 7/1966 | Morrison | 174/115 |
| 3,355,544 | 11/1967 | Costley et al. | 174/106 R |
| 3,549,788 | 12/1970 | Apen | 174/107 |
| 3,602,632 | 8/1971 | Ollis | 174/36 |
| 3,647,932 | 3/1972 | Heller et al. | 174/34 |
| 3,758,704 | 9/1973 | Naud | 174/102 E |
| 3,772,454 | 11/1973 | Donecker et al. | 174/115 X |
| 3,815,054 | 6/1974 | McClure et al. | 333/5 |
| 4,131,757 | 12/1978 | Felkel | 174/107 |
| 4,158,185 | 6/1979 | Dageforde et al. | 333/243 |
| 4,250,351 | 2/1981 | Bridges | 174/106 R |
| 4,383,725 | 5/1983 | Bogese et al. | 174/117 F |
| 4,538,023 | 8/1985 | Brisson | 174/115 |

FOREIGN PATENT DOCUMENTS

| | | | |
|---|---|---|---|
| 1465554 | 3/1969 | Fed. Rep. of Germany | 174/115 |
| 3405302 | 9/1985 | Fed. Rep. of Germany | 174/117 F |
| 572618 | 11/1923 | France . | |
| 834353 | 11/1938 | France | 174/117 F |
| 470881 | 4/1952 | Italy | 174/117 R |
| 5025 | of 1887 | United Kingdom | 174/113 R |
| 1386065 | 3/1975 | United Kingdom | 174/117 F |
| 2049262 | 12/1980 | United Kingdom . | |

*Primary Examiner*—Morris H. Nimmo
*Attorney, Agent, or Firm*—Warren B. Kice

[57] ABSTRACT

A signal cable assembly comprising a pair of cables adapted to respectively carry the positive and negative audio signals between a power source and a load. Each cable consists of a first conductor formed by a plurality of bundles of wire strands twisted together to form a single conductor, and a second conductor in the form of a solid conductor having a diameter larger than the diameter of each wire strand. Insulation sleeves extend around the conductors for at least a portion of the length thereof.

12 Claims, 1 Drawing Sheet

SIGNAL CABLE ASSEMBLY

Matter enclosed in heavy brackets [ ] appears in the original patent but forms no part of this reissue specification; matter printed in italics indicates the additions made by reissue.

BACKGROUND OF THE INVENTION

This invention relates to a cable assembly, and, more particularly, to a cable assembly for transmitting an electrical signal between a power source and a load.

Various types of cables have been used to transfer electrical current, in some form of signal, between a power source and a load. For example, the signal from an audio amplifier is transmitted by a cable to a loudspeaker for producing a replica of a signal from a program source that is introduced to the amplifier. However, there is much controversy as to the optimum type of cable that should be used in this environment.

SUMMARY OF THE INVENTION

It is an object of the present invention to provide a signal cable which provides optimum paths for the signal being transmitted.

It is a further object of the present invention to provide a signal cable of the above type in which a solid conductor is provided for carrying the low frequency components of the signal and a plurality of bundles of wire strands are provided for carrying the high frequency components of the signal.

It is a further object of the present invention to provide a signal cable of the above type in which the bundles of wire strands are twisted into a rope-lay configuration and wrapped around the dielectric core.

Toward the fulfillment of these and other objects, the signal cable assembly of the present invention comprises a pair of cables each of which consists of a first conductor and a second conductor disposed in a parallel relationship. The first conductor is in the form of a plurality of bundles of wire strands twisted together to form a single conductor and the second conductor is in the form of a single solid conductor. An insulation material extends around each conductor for at least a portion of the length thereof.

DESCRIPTION OF THE DRAWINGS

The above brief description, as well as further objects, features and advantages of the present invention will be more fully appreciated by reference to the following detailed description of the presently preferred but nonetheless illustrative embodiment in accordance with the present invention when taken in conjunction with the accompanying drawing wherein.

DESCRIPTION OF THE PREFERRED EMBODIMENT

Figure 1:
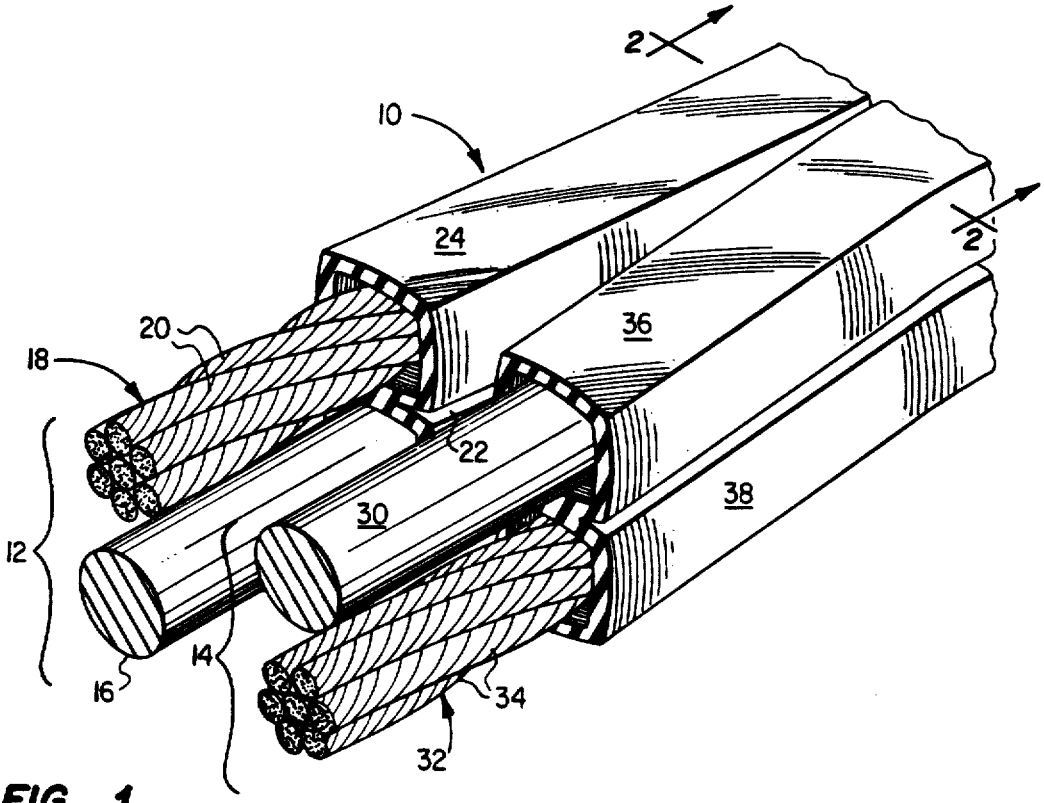
FIG. 1 is a partial perspective view of the improved signal cable assembly of the present invention with the insulation being removed from the end portions of the cables forming the assembly.

Referring specifically to FIG. 1 of the drawings the reference numeral 10 refers, in general, to the improved signal cable assembly of the present invention which comprises a pair of cables 12 and 14 shown disposed in a parallel, juxtaposed relationship. The cable 12 consists of a solid conductor 16 extending immediately adjacent a conductor 18 formed by a plurality of bundles 20 of wire strands twisted together. The wire strands forming each bundle 20 are twisted in a first direction and the bundles themselves are twisted in the direction opposite the first direction. The diameter of the conductor 16 is substantially equal to the diameter of the conductor 18.

A pair of insulating sleeves 22 and 24 extend over the conductors 16 and 18 respectively, for the length thereof with the exception of the end portions which have been removed as shown in FIG. 1 to permit connection of the respective cables to a signal source or to a load. The cable 14 is constructed in a similar manner and, as such, includes a solid conductor 30 extending in a juxtaposed relation to a conductor 32 formed by a plurality of bundles 34 of strands twisted together to form a single conductor as in the previous embodiment. The wire strands forming each bundle 34 are twisted in a first direction and the bundles themselves are twisted in a direction opposite the first direction, also in a manner similar to that of the conductor 18. A pair of plastic flexible sleeves 36 and 38 extend over the conductors 30 and 32 respectively, and extend for the entire length thereof except for the end portions shown in FIG. 1.

Figure 2:
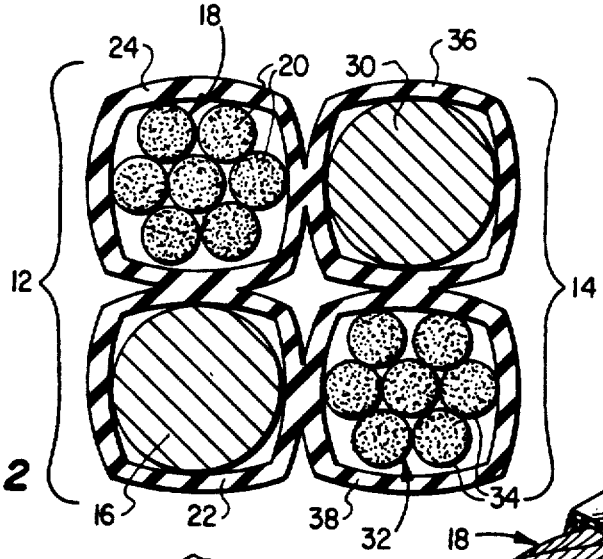
FIG. 2 is a vertical cross-sectional view taken along the lines 2—2 of FIG. 1.

As better shown in FIG. 2, the insulating sleeve 24 is molded to the sleeves 22 and 36 along the corresponding abutting side walls thereof while the insulating sleeve 38 is molded to the sleeves 22 and 36 also along the corresponding side walls thereof to form an integral assembly.

Figure 3:
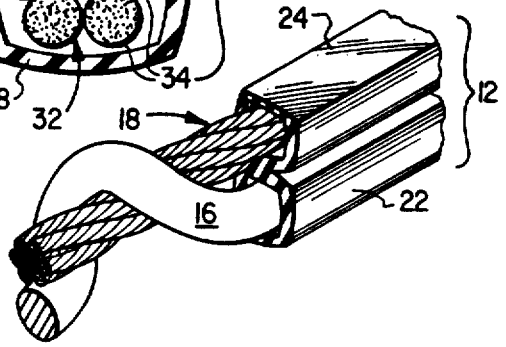
FIG. 3 is a perspective view, on a reduced scale, depicting one of the cables of the assembly of FIGS. 1 and 2 with the respective end portions of the two conductors forming the cable being twisted together for connection to a power source or load.

FIG. 3 depicts the cable 12 with the conductor 16 twisted around the conductor 18 to prepare the cable for connection, as a single unit, to a signal source or to a load, it being understood that the connections may be made through an appropriate terminal, terminator, connector, or the like. For example, if the cable 12 was to be connected between two audio components, such as an amplifier and a loudspeaker, the end portions of the conductors 16 and 18 would be stripped of the end portions of their respective insulating sleeves 22 and 24 and twisted together as shown in FIG. 3 before being inserted as a single unit, in the proper terminal of a five-way binding post connected to the amplifier and/or loudspeaker. It is understood that the cable 14 would be stripped, twisted, and inserted in a similar manner. The end portion of the cable 12 could be connected to the "positive" terminals of the amplifier and loudspeaker, respectively, while the end portions of the cable 14 could be connected to the "negative" terminals respectively, or visa versa.

It is noted that the arrangement is such that the solid conductor 16 of the cable 12 is disposed adjacent the conductor 32 formed by the wire bundles 34, of the cable 14, while the conductor 18 formed by the wire bundles 20 of the cable 12 is disposed adjacent the solid conductor 30 of the cable 14.

Figure 4:
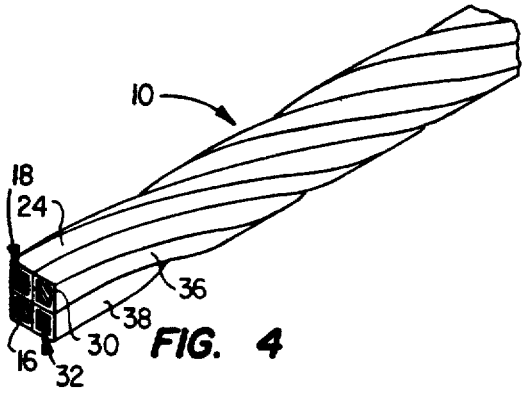
FIG. 4 is a perspective view, on a reduced scale, of the signal cable assembly of FIGS. 1 and 2, but showing the twisting of the various conductors forming the cable assembly relative to each other.

Referring to FIG. 4, after assembly in the manner described above, the respective conductors 16, 18, 30, and 32 are twisted relative to each other approximately one turn per inch as shown in FIG. 4 to impart an overall twist to the finished cable assembly 20 as shown.

Several advantages result from the foregoing. For example, the wire strands forming each bundle provide an optimum path for the high frequency components of the signal, while the solid conductors form an optimum path for the low frequency components for the signal.

It is understood that several variations may be made in the foregoing with departing from the scope of the invention. For example, although the conductors 18 and 32 are shown as being formed by seven bundles of wire strands it is understood that this number can vary without departing from the scope of the inventon. Also the conductors 16 and 30 and are not necessarily limited to a single solid conductor but can be formed by a plurality of solid conductors together forming a single cable.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention therein.

What is claimed is:

[1. A single cable assembly for transferring positive and negative signals between a source and a load, said cable assembly comprising:

a first conductor comprising a plurality of bundles of wire strands twisted together and insulation means extending around said bundles of wire strands for a portion of the lengths thereof;

a second conductor comprising a plurality of bundles of wire strands twisted together and insulation means extending around said bundles of wire strands for a portion of the lengths thereof;

a third conductor comprising at least one solid wire of a diameter greater than the diameter of each of said wire strands, and insulation means extending around said solid wire for a portion of the length thereof;

a fourth conductor comprising at least one solid wire of a diameter greater than the diameter of each of said wire strands, and insulation means extending around said solid wire for a portion of the length thereof;

said first and third conductors extending in a juxtaposed relationship with their respective axes extending parallel and with their respective uninsulated portions being twisted together to provide a single conductive path for said positive signal;

said second and fourth conductors extending in a juxtaposed relationship with their respective axes extending parallel and with their respective uninsulated portions being twisted together to provide a single conductive path for said negative signal; and said second and fourth conductors extending adjacent said first and third conductors.]

[2. The signal cable assembly of claim 1 wherein said first conductor extends adjacent said fourth conductor and wherein said third conductor extends adjacent said second conductor.]

[3. The assembly of claim 1 wherein the wire strands forming each bundle are twisted in a first direction and the bundles are twisted in a direction opposite said first direction.]

[4. The assembly of claim 1 wherein the respective insulated portions of all of said conductors are twisted relative to each other.]

[5. The assembly of claim 1 wherein the respective insulated portions of said first and third conductors are molded together and wherein the respective insulation portions of said second and fourth conductors are molded together.]

[6. The assembly of claim 1 wherein the diameter of said solid wires are substantially equal to the diameters of said twisted bundles of wire strands.]

*7. A signal cable assembly for transferring positive and negative signals between a source and a load, said cable assembly comprising:*

*(1) a first cable for carrying the positive portion of said signal, said first cable comprising:*

*(a) a first conductor comprising at least one wire;*

*(b) a second conductor comprising a plurality of bundles of wires;*

*(c) the diameter of at least one of said wires of said bundles being different from the diameter of said at least one wire of said first conductor;*

*(d) a first insulating material extending around said first conductor; and*

*(e) a second insulating material extending around said second conductor; and*

*(2) a second cable extending to the side of said first cable in a spaced parallel relationship for carrying the negative portion of said signal, said second cable comprising:*

*(a) a first conductor comprising at least one wire;*

*(b) a second conductor comprising a plurality of bundles of wires;*

*(c) the diameter of at least one of said wires of said bundles being different from the diameter of said at least one wire of said first conductor;*

*(d) a first insulating material extending around said first conductor; and*

*(e) a second insulating material extending around said second conductor; and*

*(3) each of said first conductors of said first and second cables being adapted to carry the relatively low frequency components of said signal and each of said second conductors of said first and second cables being adapted to carry the relatively high frequency portions of said signal.*

*8. The cable assembly of claim 7 wherein the diameter of said at least one wire of each of said first conductors of said first and second cables is greater than the diameter of each wire of said bundles of each of said second conductors of said first and second cables.*

*9. The cable assembly of claim 8 wherein the diameter of said at least one wire of each of said first conductors of said first and second cables is substantially equal to the diameter of said bundles of each of said second conductors of said first and second cables.*

*10. The cable assembly of claim 7 wherein the wires of each of said bundles of each of said second conductors of said first and second cables are twisted.*

*11. The cable assembly of claim 10 wherein the bundles of each of said second conductors of said first and second cables are twisted in a direction opposite the direction of twist of their respective wires.*

*12. The cable assembly of claim 7 wherein said insulating material of said first and second cables is molded into an integral single unit including a plurality of sleeves respectively extending over said conductors of said first and second cables.*

*13. The cable assembly of claim 12 wherein said insulating material of said first and second cables extends between said conductors of said first and second cables.*

*14. The cable assembly of claim 7 wherein one of the conductors of each of said first and second cables is superposed over the other conductor thereof.*

*15. The cable assembly of claim 7 wherein said first and second conductors of said first cable are adapted to be connected together so that they together transfer said positive signal portion, and wherein said first and second conductors of said second cable are adapted to be connected together so that they together transfer said negative signal portion.*

*16. The cable assembly of claim 7 wherein said first conductor of said first cable extends adjacent and to the side of said second conductor of said second cable and where said second conductor of said first cable extends adjacent and to the side of said first conductor of said second cable.*

*17. The cable assembly of claim 7 wherein said second cable extends to the side of said first cable and wherein said first and second conductors of each cable extend in a vertically-spaced, parallel relationship.*

*18. The cable assembly of claim 17 wherein said second conductor of said first cable extends over said first conductor of said first cable and said first conductor of said second cable extends over said second conductor of said second cable.*

* * * * *